3,729,450
METHOD OF RECOVERING COPOLYMERS
Francis R. Galiano and Norman A. Greenlee, Overland Park, Kans., assignors to Gulf Research & Development Company, Pittsburgh, Pa.
No Drawing. Filed Mar. 10, 1971, Ser. No. 123,031
Int. Cl. C08f 1/96
U.S. Cl. 260—78.5 T                    3 Claims

ABSTRACT OF THE DISCLOSURE

Maleic anhydride and aliphatic 1-olefins having from 8 to 18 carbon atoms inclusive are copolymerized in the presence of a free radical catalyst and an efficient solvent for both the monomers and the resulting copolymer, for example 1,1- or 1,2-dichloroethane. Enough solvent is employed to solubilize not only the reactants but also the copolymer products to give solutions of moderate viscosities. The products are then recovered by steam distillation until solvent and other liquid materials are removed, leaving molten copolymer, which is then poured on a chilled metal surface on which the polymer rapidly solidifies. The steam stripped copolymers are sufficiently non-tacky and brittle so that they are parted from the metal surface and broken into chunks by bending or inverting the chilled surface and allowing the solid material to fall for a substantial distance into a container.

DESCRIPTION OF THE INVENTION

The preparation of copolymers of maleic anhydride with various unsaturated monomers, particularly ethylene and styrene is well known in the art. More recently, copolymers of maleic anhydride with various linear aliphatic 1-olefins have been prepared, many of which are finding uses in a number of new applications. It has been found however, that in the preparation of a coplymer of maleic anhydride and a 1-olefin having from 8 to 18 carbon atoms per molecule that the recovery of the copolymers presents some fairly difficult problems. The use of an excess of olefin so as to obtain more complete reaction increases the difficulty of separating the product.

A satisfactory practice which has been used as disclosed, for example, in U.S. Pat. 3,461,108, is to employ certain efficient solvents for the polymerization step, keeping the monomers and in some instances the polymers also in solution during the polymerization and then adding to the resulting solution another liquid, which causes precipitation of the polymer products in finely divided filterable solid form. The selection of the combination of reaction solvent and precipitating solvent is critical. A very limited choice of solvent combinations exists, no completely satisfactory precipitating solvent having been found for some copolymers. Furthermore, the solvents are expensive and for this reason must be separated and recovered. The solvent separation, polymer filtration and washing steps require bulky equipment and are time consuming.

It has now been found in accordance with the present invention that copolymers of maleic anhydride with a variety of linear aliphatic 1-olefins having from 8 to 18 carbon atoms per molecule can be produced in a reasonably pure particulate solid form by a process which comprises: copolymerizing maleic anhydride and at least one of said olefins in the presence of a free radical catalyst and an efficient solvent having a boiling point below about 175° C. at one atmosphere, preferably a saturated dihalogenated aliphatic liquid hydrocarbon having between 1 and 5 carbon atoms, for example 1,1-dichloroethane or 1,2-dichloroethane, said solvent being used in an amount sufficient to solubilize the maleic anhydride, aliphatic olefin and resulting copolymer, yielding a solution of moderate viscosity; thereafter distilling reaction solvent from the polymerization product solution and treating the polymerization product mixture by steam distillation at a temperature below 180° C. to yield molten copolymer substantially free of reaction solvent and unreacted 1-olefin and recovering said copolymer by pouring it in the molten state on to a cool surface, preferably a moving metal belt or a stationary chilled metal surface coated with a mold release material where it is solidified by cooling to yield a non-tacky, brittle solid resin which is readily parted from the metal surface by bending or inverting and may be broken into chunks by dropping a substantial distance into a container.

Our results indicate that the 1-olefin is best removed by sparging steam through the reaction mixture at 140–150° while under sub-atmospheric pressure. The pressure reduction obtained with a water aspirator is sufficient for the purpose. The bulk of the chlorinated solvent (1,1-dichloroethane, B.P. 57°) may be removed at low temperature, following which the mixture is heated to about 140° under reduced pressure before steam is introduced. The distillate condenses in the form of an emulsion containing 1-olefin, a clear bottom layer which is mainly water and a mixed intermediate layer which remains emulsified. A typical distribution of distillate obtained from 1-octadecene copolymer is as follows:

Top layer _____ 20% (by vol.).
Intermediate layer _____ 13%.
Bottom layer _____ 67%.

Closer examination of the intermediate layer indicates that it is basically part of the water phase and contains 96% water and 4% 1-olefin. This represents only 2.7% of the total 1-olefin recovered and may be discarded along with the water layer, if desired.

The 1-olefin layer may be drawn off and submitted for analyses without further treatment. Further analyses, shown below, indicate that in the case of octadecene the 1-olefin is of good quality, suitable for recycle with little or no further purification:

Analyses of recovered 1-olefin

Acidity _____ 0.086% as maleic acid.
$H_2O$ _____ <0.10%
Chlorine _____ 0.023%.
Bromine number _____ 66.36.

The maleic anhydride-1-octadecene product is a viscous resin at 145° C. but is capable of removal from the reactor by a suitable pump. The product when allowed to cool in the absence of water is mainly the anhydride, although some acid groups are detectable by infrared absorption spectroscopy. If exposed to water at temperatures near 100° C. large amounts of carboxylic acid groups are formed in the polymer but in either case, vacuum drying at temperatures above 100° C. yields the anhydride form.

Chilled belt conveyors are available or may be constructed. (See, for example, Perry's Chemical Engineers Handbook, 4th edition, pages 11–44.) Any cooled metal surface can be used to collect and solidify the polymer, such as a revolving metal disc or rotating drum with the polymer being broken loose by bending or vibration of the metal surface after the polymer has cooled.

Copolymers of maleic anhydride with both 1-octadecene and 1-tetradecene have been recovered from their reaction mixtures by steam distillation. A batch synthesis of maleic anhydride-tetradecene copolymer made in a 200-gallon reactor is illustrative. After the polymerization reaction was completed, high pressure steam was introduced into the reactor jacket and the system was opened through a condenser to a 500-gallon reactor. During heat-up to 150–160° C., the 1,2-dichloroethane reaction solvent was distilled over into and was drained from the 500-gallon reactor. A vacuum was then applied to the system and high pressure steam was introduced through the bottom reactor valve at 1 lb./min. Samples were collected hourly to measure the rate of olefin removal. After 20 hours, the steam rate was increased to 2 lbs./min., which speeded up the rate of removal of the last 5 percent of residual monomer. After 29 hours total distillation time, no organic phase was visible in the condensate and analytical results later verified that the product contained no free olefin. Steam requirements were 17 lbs./lb. of monomer removed.

The molten maleic anhydride-tetradecene copolymer was discharged into an aluminum pan coated with a mold release composition and after solidifying by cooling, was broken out by inverting the pan and was broken into chunks by being allowed to fall into a container. Afterward the chunks of polymer were broken up to pass a ¼ inch screen. The 118 pounds recovered represented 79 percent of theoretical.

The condensate separated into three phases; water, emulsion and organic. The water phase had a pH of 2.5 and an acidity equivalent to 1.7 percent maleic acid. The organic phase was essentially 100 percent tetradecene with a slight trace of water and acidity. The reclaimed 1,2-dichloroethane contained approximately 0.9% maleic anhydride and 0.4% tetradecene.

In summary, removal of liquid materials from maleic anhydride-1-olefin copolymerization mixtures by steam distillation offers an attractive means of isolating this product. In addition, the 1-olefin is recovered by this process in a state of purity which is suitable for direct recycle with little or no further treatment.

When the present method is employed, the choice of solvents for the polymerization reaction is not so limited as with prior art methods. Among the efficient solvents which have been found to work satisfactorily are ethyl acetate, toluene, tetrahydrofuran, dimethoxyethane and 1,4-dioxane. Various other commercial aromatic hydrocarbon, ester, ether and ketone solvents may also be used. Obviously only efficient solvents are desirable, so that the volume of solvent necessary in the process may be kept as low as possible.

We claim:
1. In a process for manufacturing a copolymer of maleic anhydride with an aliphatic 1-olefin comprising copolymerizing maleic anhydride and at least one aliphatic 1-olefin having from 8 to 18 carbon atoms in the presence of a free radical catalyst and an efficient solvent having a boiling point below about 175° C. at one atmosphere, said solvent being used in an amount sufficient to solubilize the maleic anhydride, aliphatic olefin and resulting copolymer the improvement consisting of thereafter distilling reaction solvent from the polymerization product solution so obtained and treating the resulting crude polymerization product by steam distillation at a temperature between 140° C. and 180° C. to yield molten copolymer, substantially free of reaction solvent and unreacted 1-olefin and recovering said copolymer by pouring it in the molten state on to a cool surface where it is solidified to yield a brittle, non-tacky solid resin.

2. In a process for manufacturing a copolymer of maleic anhydride with 1-octadecene comprising copolymerizing maleic anhydride and 1-octadecene in the presence of a free radical catalyst and a solvent comprising a saturated dihalogenated aliphatic liquid hydrocarbon having between 1 and 5 carbon atoms, said solvent being used in an amount sufficient to solubilize the maleic anhydride, 1-octadecene and resulting copolymer; the improvement consisting of thereafter distilling reaction solvent from the polymerization product solution so obtained and treating the resulting crude polymerization product by steam distillation at a temperature between 140° and 150° C. under sub-atmospheric pressure to yield molten copolymer, substantially free of reaction solvent and unreacted 1-octadecene and recovering said copolymer by pouring it in the molten state on to a chilled metal surface where it is solidified by cooling to yield a brittle non-tacky solid resin.

3. In a process for manufacturing a copolymer of maleic anhydride with an 1-tetradecene comprising copolymerizing maleic anhydride and 1-tetradecene in the presence of a free radical catalyst and a solvent comprising a saturated dihalogenated aliphatic liquid hydrocarbon having between 1 and 5 carbon atoms, said solvent being used in an amount sufficient to solubilize the maleic anhydride, 1-tetradecene and resulting copolymer; the improvement consisting of thereafter distilling reaction solvent from the polymerization product solution so obtained and treating the resulting crude polymerization product by steam distillation at a temperature between 140° and 150° C. under sub-atmospheric pressure to yield molten copolymer, substantially free of reaction solvent and unreacted 1-tetradecene and recovering said copolymer by pouring it in the molten state on to a chilled metal surface where it is solidified by cooling to yield a brittle non-tacky solid resin.

References Cited
UNITED STATES PATENTS

| | | | |
|---|---|---|---|
| 3,560,456 | 2/1971 | Hazen et al. | 260—78.5 |
| 3,560,457 | 2/1971 | Hazen et al. | 260—78.5 |
| 3,575,942 | 4/1971 | Fontana | 260—78.5 |

JOSEPH L. SCHOFER, Primary Examiner

J. KIGHT III, Assistant Examiner